Feb. 13, 1951 G. A. CHEREM 2,541,337
HEATING AND AIR CONDITIONING SYSTEM
Filed March 23, 1946
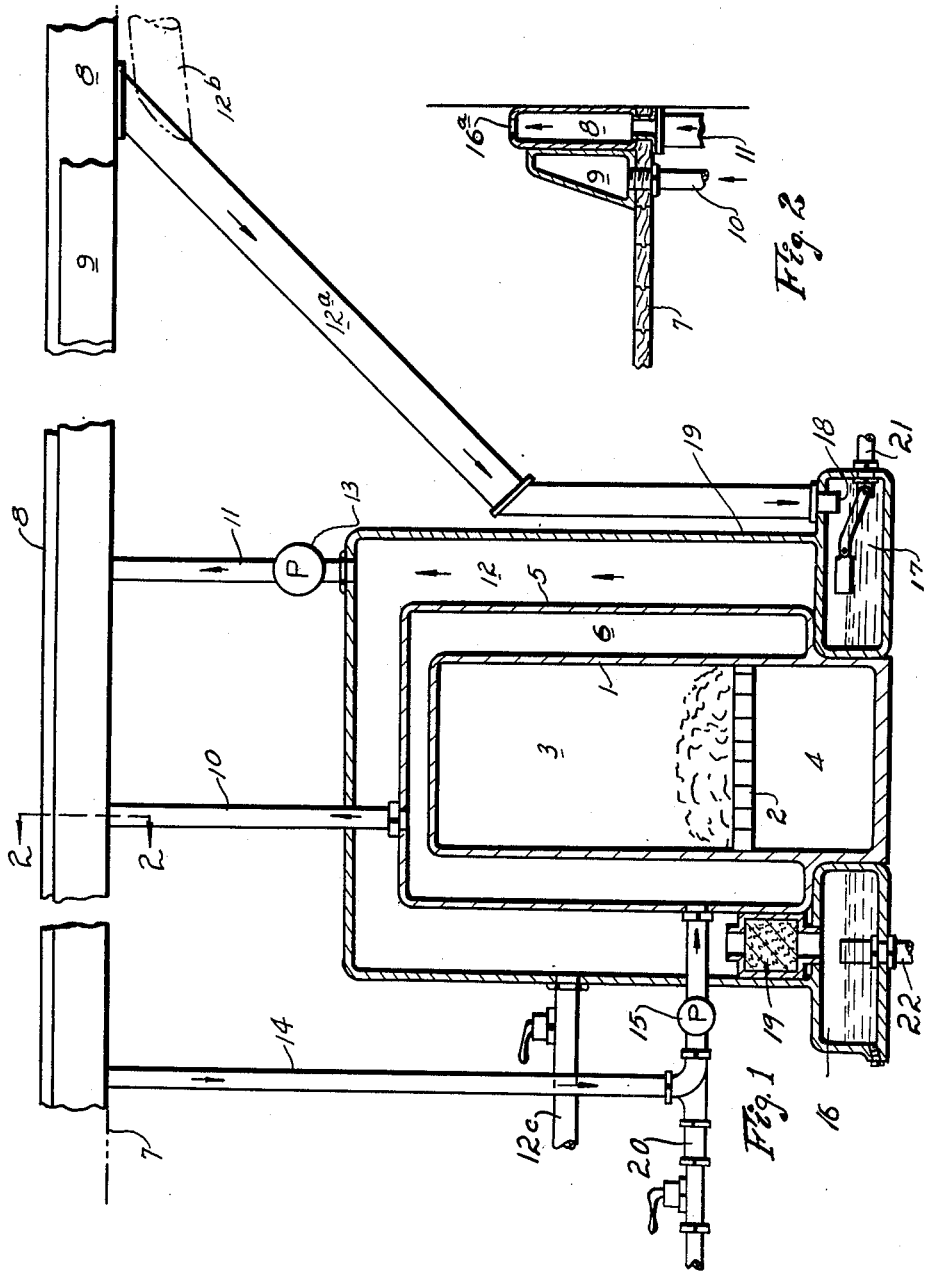
INVENTOR
GABRIEL A. CHEREM
BY
ATTORNEY.

Patented Feb. 13, 1951

2,541,337

UNITED STATES PATENT OFFICE 2,541,337

HEATING AND AIR CONDITIONING SYSTEM

Gabriel A. Cherem, Detroit, Mich.

Application March 23, 1946, Serial No. 656,702

2 Claims. (Cl. 237—1)

This invention relates to an air conditioning system for a building and is particularly adapted for use in a house. The system includes means whereby air from atmosphere is caused to flow to a housing enclosing a furnace and means for filtering the air prior to discharge of the same to a room wherein a conduit is provided at the floor line adjacent a wall of the room and a similar conduit preferably having a wall thereof in contact with a wall of the first named conduit through which hot or cold air, hot or cold water or steam from the furnace is discharged, all as hereinafter set forth and described in detail. The object of the invention is to provide an air conditioning system whereby an enclosed space may be heated or cooled depending upon the temperature of atmosphere externally of the said space.

A structure embodying my invention is shown in the accompanying drawing in which:

Fig. 1 is an elevation showing a furnace in section and the conduits through which hot air, hot water or steam may be discharged.

Fig. 2 is a cross section on line 2—2 of Fig. 1 showing the preferred relationship of the air and steam conduits and the position of the same at the junction of the floor and wall of a room.

The furnace may be of any desired shape and is preferably cylindrical in form having an inner casing 1 within which there is a fuel grate 2 and a heating chamber 3 thereabove and an ash pit 4 therebelow. A casing 5 is spaced from the inner casing 1 providing a water chamber 6 therebetween.

At the floor line 7 of the room to be heated is positioned an air conduit 8, as shown in Fig. 2, and in surface contact therewith on the inner side is a hot water or steam conduit 9 and steam or hot water from the chamber 6, which surrounds the fuel chamber (except the front thereof in which the fuel and ash pit doors are positioned), passes through the conduit 10 and thence into the conduit 9 and the conduit 11 provides for flow of air through the air conduit 8 which is provided with a series of apertures 16a. The conduits 8 and 9 are preferably integral in form. The conduit 11 opens to the upper end of a chamber 12 which surrounds the furnace except the front side thereof where the usual fuel and ash pit doors, not here shown, are provided. The valve controlled conduit 12c may be used to supply heated fluid to other apparatus requiring the same. A blower 13 takes the heated air from the chamber 12 which is supplied from atmosphere through the conduit 12a and discharges the same through the conduit 11, open at one end to atmosphere, to the air conduit 8 and thence through the apertures 16a into the room.

To maintain circulation of hot water or steam in the conduit 9, a conduit 14 is provided through which the water or condensed steam discharging from the conduit 9 at the floor of the room is caused to return to the chamber 6 below the normal water level therein. Thus any material accumulation of water in the conduit 9 is prevented. The steam return conduit 14 opens to the water chamber 6 below the water level therein. There is an impeller 15 in the return line 14 for causing withdrawal of condensed steam or water from the conduit 9 in the room and discharges the same to the chamber 6 below the water level therein.

The point of juncture of the live steam line 10 with the conduit 9 is to be understood as being remote from the point of contact of the return line 14 therewith. Air from atmosphere may be drawn through the conduit 12b to a chamber 16 at the base of the furnace in which water 17 is maintained at a desired level and the return air conduit terminates at the point 18 just above the water level. The air drawn from the room through the conduit 12a flows across the surface of the water in the chamber 16 and then passes through a filter 19 to the chamber 12 surrounding the furnace (except the side thereof in which the fuel and ash pit doors are positioned) and is thus purified before discharging to the room through the apertures 16a in a heated and purified condition. An outlet for air from the room may be provided if found desirable but normally there is enough leakage of air from the room through door and window crevices to maintain sufficient oxygen in the air particularly in view of the fact that air from atmosphere is discharged into the room through aperture 16a in the air conduit 8.

As previously stated the conduits 8 and 9 are at the floor line of the room preferably in contact with the wall surface and extend along one side of the room or more than one side thereof depending upon the area to be heated. The conduit 12a for the air may have an inlet to atmosphere, as indicated by dotted lines 12b in Fig. 1 or it may be connected directly to one end of the conduit 8 as shown in full lines in Fig. 1. By the described arrangement of parts air discharging to the room through the aperture 16a may be heated or cooled and is purified due to the air flowing across the water surface in the chamber 16.

In the latter case withdrawing of the air from the room causes a flow of air from atmosphere into the room through crevices about the window and door openings and the opening and closing of the windows and doors further tends to maintain the proper oxygen content of the air within the room.

By the described arrangement of air and water conduit, water flowing through the conduit 9 will cool the air flowing through the conduit 8 or, if hot water or steam is flowing in the conduit 9, the air flowing from the conduit 9 will be heated and pass through the aperture 16a into the room. Thus the air in the room may be maintained at a desired temperature. In the summertime cold fluid is discharged through the conduit 8 and in the wintertime warm fluid may be passed through the conduit 9. It is desirable to provide a waste line 22 which opens to the chamber 16. In the event of failure of operation of the float control valve in the conduit 21 liquid may flow through the waste conduit 22 and thus prevent an accumulation of water in the chamber 12.

From the foregoing description it is believed evident that the parts and the structural arrangement are well adapted for the purpose described.

Having thus briefly described my invention, its utility and mode of operation, what I claim and desire to secure by Letters Patent of the United States is:

1. A heating and air conditioning system for an enclosed space comprising a furnace having a central fuel chamber, a wall thereabout providing a water chamber therebetween, a second wall enclosing the water chamber and providing an air chamber, a pair of conduits along a side of the enclosed space, one of said conduits having apertures opening to the enclosed space and the other conduit being closed to the said space, means for causing a flow of air from atmosphere into the air chamber, a steam riser conduit extending from the water chamber to the conduit closed to the space a conduit opening at one end to the air chamber and at the other end discharging to the apertured conduit within the room, means for withdrawing condensed steam from the steam conduit and discharging to the space between the fuel chamber and the enclosing chamber, a chamber at the bottom of the furnace for containing water, the air from atmosphere flowing across the water surface, and a filter through which the air subsequently passes to the air chamber.

2. An air conditioning and heating system for a room, comprising a furnace having a fuel chamber, a water chamber enclosing the same, an air chamber having a wall in spaced relation with the water chamber, a conduit opening to atmosphere at one end and discharging to the air chamber at the opposite end, a blower for causing flow of air from the air chamber, a rectangularly shaped and apertured air conduit within the room to which the air is discharged by the blower, a water pan at the bottom of the furnace over which said air from atmosphere discharges in close association with the surface of the water in the water pan, a filter through which the said air passes before being discharged in heated condition to the room, a supply conduit opening to the steam space of the furnace, a second conduit in the room alongside said air conduit through which the steam is discharged and a condensate return line opening to one end of the steam conduit in the room and discharging to the water chamber below the water level therein.

GABRIEL A. CHEREM.

REFERENCES CITED

The following references are of record in the file of this patent:

UNITED STATES PATENTS

| Number | Name | Date |
|---|---|---|
| 631,061 | Barbour | Aug. 15, 1899 |
| 1,365,807 | Weber | Jan. 18, 1921 |
| 1,825,116 | Holden | Sept. 29, 1931 |
| 1,907,527 | Erskine | May 9, 1933 |
| 2,006,849 | Warren | July 2, 1935 |
| 2,095,186 | Gill | Oct. 5, 1937 |
| 2,269,055 | Gower | Jan. 6, 1942 |
| 2,277,247 | Morse | Mar. 24, 1942 |